US010767632B2

(12) United States Patent
Lynderup et al.

(10) Patent No.: US 10,767,632 B2
(45) Date of Patent: Sep. 8, 2020

(54) TRANSITION PIECE FOR A WIND TURBINE (71) Applicant: SIEMENS GAMESA RENEWABLE ENERGY A/S, Brande (DK)

(72) Inventors: Henrik Fomsgaard Lynderup, Skals (DK); Jasper Koot, De Meern (NL); Jesper Moeller, Esbjerg (DK); Mark Reinders, The Hague (NL)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/331,397

(22) PCT Filed: Aug. 4, 2017

(86) PCT No.: PCT/EP2017/069762
§ 371 (c)(1),
(2) Date: Mar. 7, 2019

(87) PCT Pub. No.: WO2018/046205
PCT Pub. Date: Mar. 15, 2018

(65) Prior Publication Data
US 2019/0249647 A1      Aug. 15, 2019

(30) Foreign Application Priority Data
Sep. 9, 2016    (EP) ................. 16188144

(51) Int. Cl.
*F03D 13/25*       (2016.01)
*E02B 17/00*       (2006.01)
(Continued)

(52) U.S. Cl.
CPC .............. *F03D 13/25* (2016.05); *E02B 17/00* (2013.01); *E02B 17/0004* (2013.01);
(Continued)

(58) Field of Classification Search
CPC ....... Y02E 10/727; F03D 80/82; F03D 13/25; F05B 2240/95; E02B 2017/0039; E02B 2017/0043; E02B 2017/0091
See application file for complete search history.

(56) References Cited

U.S. PATENT DOCUMENTS 3,672,115 A * 6/1972 Abe .................... E04H 12/34
                                                52/745.17
4,002,038 A * 1/1977 Phares .................. E02B 17/025
                                                405/199
(Continued)

FOREIGN PATENT DOCUMENTS

CA    2773190 A1 * 10/2012 ............. F03D 80/85
CN    201538971 U       8/2010
(Continued)

OTHER PUBLICATIONS

Office Action in related Chinese Patent Application No. 201780055673.9, dated Dec. 27, 2019. 8 pages.

*Primary Examiner* — Robert Canfield
(74) *Attorney, Agent, or Firm* — Schmeiser, Olsen & Watts LLP (57) ABSTRACT

Provided is a transition piece for a wind turbine, to connect a wind turbine to a foundation, wherein the transition piece includes a connection area to be connected to a foundation.

12 Claims, 5 Drawing Sheets

(51) Int. Cl.
 *E02D 27/42* (2006.01)
 *E04H 1/00* (2006.01)
 *F03D 80/80* (2016.01)

(52) U.S. Cl.
 CPC ............ *E02D 27/425* (2013.01); *E04H 1/00* (2013.01); *F03D 80/82* (2016.05); *E02B 2017/0043* (2013.01); *E02B 2017/0091* (2013.01); *F05B 2230/60* (2013.01); *F05B 2240/95* (2013.01); *Y02B 10/30* (2013.01); *Y02E 10/727* (2013.01)

(56) References Cited

U.S. PATENT DOCUMENTS

| | | | | |
|---|---|---|---|---|
| 4,012,917 | A * | 3/1977 | Gendron | E02B 17/025 |
| | | | | 405/199 |
| 8,640,340 | B2 * | 2/2014 | Foo | B63B 35/003 |
| | | | | 114/259 |
| 9,410,340 | B2 * | 8/2016 | Zhao | E02B 17/0004 |
| 9,567,721 | B2 * | 2/2017 | Moiret | E02B 17/021 |
| 9,644,386 | B2 * | 5/2017 | Sanz Pascual | F03D 13/20 |
| 9,847,945 | B2 * | 12/2017 | Smidth | H04W 28/22 |
| 10,001,111 | B2 * | 6/2018 | Patberg | E04H 12/34 |
| 10,184,260 | B2 * | 1/2019 | Bartminn | E04H 12/10 |
| 10,302,070 | B2 * | 5/2019 | Donescu | E02B 17/0004 |
| 10,487,806 | B2 * | 11/2019 | Huot | B62D 55/06 |
| 2007/0269272 | A1 * | 11/2007 | Kothnur | E02D 27/42 |
| | | | | 405/195.1 |
| 2011/0155038 | A1 * | 6/2011 | Jahnig | F03D 13/22 |
| | | | | 114/264 |
| 2012/0139256 | A1 * | 6/2012 | Gajewski | F03D 1/00 |
| | | | | 290/55 |
| 2013/0272796 | A1 * | 10/2013 | Horton, III | E02B 17/02 |
| | | | | 405/204 |
| 2013/0302096 | A1 * | 11/2013 | Rodr Guez Tsouroukdissian | E02B 17/0008 |
| | | | | 405/225 |
| 2015/0204101 | A1 * | 7/2015 | Zhao | F03D 13/22 |
| | | | | 52/704 |
| 2015/0240442 | A1 * | 8/2015 | Garcia-Valdecasas Bernal | E02D 27/10 |
| | | | | 405/208 |
| 2015/0314834 | A1 * | 11/2015 | Prats Mustaros | F03D 13/22 |
| | | | | 405/223.1 |
| 2015/0354203 | A1 * | 12/2015 | Drewes | E02B 17/0004 |
| | | | | 52/651.01 |
| 2016/0195070 | A1 * | 7/2016 | Li | F03D 13/25 |
| | | | | 416/244 A |
| 2016/0229494 | A1 * | 8/2016 | Bergua | F03D 13/22 |
| 2016/0230746 | A1 * | 8/2016 | Dagher | F03D 13/25 |
| 2017/0159260 | A1 | 6/2017 | Stiesdal | |
| 2018/0135267 | A1 * | 5/2018 | Reales Bertomeo | E02B 17/0004 |
| 2018/0238304 | A1 * | 8/2018 | Umez-Eronini | F03D 9/17 |
| 2019/0195201 | A1 * | 6/2019 | Thrue | F03D 13/25 |
| 2019/0334325 | A1 * | 10/2019 | Findeisen | F03D 9/00 |

FOREIGN PATENT DOCUMENTS

| | | | | |
|---|---|---|---|---|
| CN | 202643847 | U | 1/2013 | |
| CN | 103469808 | A | 12/2013 | |
| DE | 10021163 | A1 * | 11/2001 | ........ E02B 17/0034 |
| DE | 102004042066 | A1 * | 3/2006 | ............ E02D 27/52 |
| DE | 102006056274 | A1 * | 5/2008 | ............ F03D 80/00 |
| DE | 202007009474 | U1 * | 12/2008 | ............ H02J 3/386 |
| DE | 102008053814 | A1 * | 2/2010 | ............ F03D 9/25 |
| DE | 102012016843 | A1 * | 2/2014 | ............ E04H 12/00 |
| DE | 20 2014 004 372 | U1 * | 7/2014 | ............ H02J 3/386 |
| DE | 202015103351 | U1 * | 7/2015 | ............ E02D 25/52 |
| EP | 1813808 | A2 * | 8/2007 | ........ E02B 17/0004 |
| EP | 2036813 | A1 * | 3/2009 | ............ B63B 35/003 |
| EP | 2374992 | A1 * | 10/2011 | ............ F03D 80/85 |
| EP | 2592199 | A1 * | 5/2013 | ............ F03D 13/20 |
| EP | 2662495 | A1 * | 11/2013 | ............ E02B 17/004 |
| EP | 2725223 | A2 * | 4/2014 | ............ F03D 80/82 |
| EP | 2725223 | A2 * | 4/2014 | ............ F03D 80/82 |
| EP | 2808546 | A1 * | 12/2014 | ........ E02B 17/0004 |
| EP | 2811160 | A1 * | 12/2014 | ............ F03D 13/25 |
| EP | 2811160 | A1 * | 12/2014 | ............ F03D 13/25 |
| EP | 2818703 | A1 | 12/2014 | |
| EP | 2905216 | A1 * | 8/2015 | ............ B63B 35/003 |
| EP | 2963183 | A1 * | 1/2016 | ............ E04H 12/00 |
| EP | 3168465 | A1 * | 5/2017 | ............ E02D 27/52 |
| EP | 3342669 | A1 * | 7/2018 | ............ B63B 1/107 |
| EP | 3385451 | A2 * | 10/2018 | ............ E02D 27/425 |
| EP | 3530809 | A1 * | 8/2019 | ............ H02G 9/00 |
| FR | 3072643 | A1 * | 4/2019 | ............ B63B 1/107 |
| GB | 1495262 | A * | 12/1977 | ............ E02B 17/027 |
| GB | 2495830 | A * | 4/2013 | ............ E02B 17/027 |
| GB | 2507248 | A * | 4/2014 | ............ E02B 17/004 |
| WO | WO-2005107425 | A2 * | 11/2005 | ............ F16M 7/00 |
| WO | WO-2006078167 | A2 * | 7/2006 | ........ E02B 17/0004 |
| WO | WO-2010147481 | A1 * | 12/2010 | ............ E02B 17/027 |
| WO | 2011143799 | A1 | 11/2011 | |
| WO | WO-2013049194 | A1 * | 4/2013 | ............ B63B 21/502 |
| WO | WO-2013185770 | A1 * | 12/2013 | ............ E02B 17/027 |
| WO | WO-2016134385 | A2 * | 8/2016 | ............ F03D 9/17 |
| WO | WO-2018133965 | A1 * | 7/2018 | ............ F03D 13/10 |
| WO | WO-2018172545 | A1 * | 9/2018 | ............ F03D 3/005 |

* cited by examiner

TRANSITION PIECE FOR A WIND TURBINE

CROSS-REFERENCE TO RELATED APPLICATIONS

This application claims priority to PCT Application No. PCT/EP2017/069762, having a filing date of Aug. 4, 2017, which is based on European Application No. 16188144.6, having a filing date of Sep. 9, 2016, the entire contents both of which are hereby incorporated by reference.

FIELD OF TECHNOLOGY

The embodiments of the invention concerns a transition piece for a wind turbine. The embodiments of the invention also concerns an offshore support structure, a wind turbine and a method for assembling an offshore support structure.

BACKGROUND

Wind turbines are known to be erected onshore or offshore. In the case of an onshore wind turbine a foundation is built on the ground and the wind turbine is installed on the foundation. In the case of an offshore wind turbine, a foundation is connected to the seabed. It is also known to use a floating foundation that is supported by the water.

Wind turbines comprise a rotor, a nacelle, and a tower. The rotor comprises rotor blades and is rotatably connected to the nacelle. The nacelle is connected to the top of the tower. The tower of the wind turbine is connected to the foundation. The foundation comprises steel and/or concrete. The foundation transfers and distributes the weight of the wind turbine and the loads acting on the wind turbine to the medium on which the foundation is resting. In the case of an offshore foundation a gravity foundation, a monopole, a tripod or a jacket structure can be used.

An electric connection can be provided to the wind turbine to connect the wind turbine to an especially land based infrastructure. The wind turbine comprises an electrical system to deliver electrical energy to the connection. To achieve this, the wind turbine can for example comprise a transformer and/or a converter. The wind turbine can also comprise switchgear. Switchgear can be any combination of electrical disconnect switches, fuses and/or circuit breakers used to control, protect and isolate electrical equipment.

Within the last years, the electrical output power of wind turbines and their mechanical size have increased. Therefore the weight of the wind turbines and the loads acting on the wind turbines also increased. Therefore it is necessary to build heavier and stronger foundations.

Due to the higher output of electrical power, the electrical equipment in the wind turbine also tends to increase in size and weight, adding additional weight and loads to the wind turbine and the foundation. It is also advantageous to use a very rigid tower for the wind turbine, which results in a high weight and the use of a lot of material.

For the reasons mentioned above, increasing amounts of material are needed for these wind turbines and they are therefore more expensive.

SUMMARY

An aspect relates to an improved arrangement to support a wind turbine.

This problem is solved by providing a transition piece for a wind turbine, to connect a wind turbine to a foundation, wherein the transition piece comprises a connection area to be connected to a foundation.

A wind turbine tower is therefore not directly connected to the foundation but an additional component, the transition piece, is used to connect these two parts. As discussed in detail below the transition piece can provide space for at least some of the electrical systems used in the wind turbine. They can therefore be moved from the tower to the transition piece and therefore less spaces is required in the tower. By choosing an appropriate shape and size of the transition piece, platforms and interior spaces for storing equipment, e.g. service containers and/or tools, working areas for service cranes, areas for personal and/or access to the tower and/or space for the electrical equipment can be provided. Bolts or other fixing means can be used to connect the transition piece to the foundation. It is especially possible to connect the transition piece to the foundation in multiple connection areas.

The transition piece can comprise a central section and at least three legs that extend horizontally outward from the central section to form a floor of the transition piece. The legs can be simply platforms or at least parts of the legs can be covered to form an interior space. The shape of the legs can be approximately rectangular. The legs can all have the same or roughly the same length. The transition piece can have n legs and an n-fold rotational symmetry.

The overall shape of the transition piece can be a star shape. The star formed by the transition piece can have three, four or more legs.

The discussed shape of the transition piece is advantageous, since it allows for a very good stability of the resulting wind turbine, especially when using a jacket foundation. The foundation can be connected to the transition piece in multiple connection areas, wherein each of the legs comprises one of the connection areas. The discussed configuration of the transition piece also allows for an efficient configuration of the provided work space with separate areas for e.g. storage of equipment, docking of vessels, working areas for cranes, etc. The connection of the legs to a central area or hub preferentially allows for access to the tower for personal and/or equipment. The central area can comprise a landing area for an elevator of the tower.

The transition piece can comprise a connection area that is prepared and arranged to connect a wind turbine tower to the transition piece. The connection area can e.g. be a flange. The connection area can especially be arranged in the central area when the previously discussed shape of the transition piece with several legs extending from a central area is used. When the transition piece provides an interior area covered by a roof, the connection area can be arranged on the roof of the transition piece. Alternatively it is possible, that the tower passes through the roof and is connected to the floor of the interior space.

The transition piece can comprise a floor. The floor can comprise a central section and several further floor sections extending horizontally from the central section. The overall shape of the floor can be a star shaped. At least a part of the floor can be an open platform that can e.g. be used as a laydown area for a crane, an area for receiving goods and personal delivered by boat and/or as a storage area. The floor can carry equipment, especially electrical equipment like transformers, convertors and/or a switchgear. It can also carry containers and/or tools. At least parts of the equipment carried by the floor can be premounted to the transition piece before mounting the transition piece to the foundation. This allows for an easy one-shore assembly.

The transition piece can comprise side walls and a roof, to provide an interior space. This is especially advantageous, since parts of the equipment, especially the electrical equipment, should remain dry. At least some of the equipment and tools discussed above can also be attached or stored in the interior space and at least some parts of the equipment can be premounted.

The floor, at least some of the walls and the roof can be made of the same material. Preferably reinforced concrete is used. The floor, at least some of the walls and the roof can be created as one piece, e.g. by pouring the complete structure from concrete and/or by pouring separate parts of the structure from concrete and then combining them into one piece, especially by an additional pouring of concrete.

At least one electrical component of the wind turbine can be located in the interior space of the transition piece. E.g. at least one transformer and/or at least one converter and/or at least part of the switchgear can be arranged within the interior space. Preferably all electrical equipment of the transition piece is stored or attached in the interior space. Alternatively at least some of the electrical gear can be arranged or attached on an outside platform.

The transition piece can comprise a platform at an outer edge to allow parts to be stored on the platform. If the transition piece comprises walls and a roof that form an interior space, as discussed previously, the outer end of the floor of the transition piece can be prolonged over the roof, thereby creating an open platform. The platform can be used for storing equipment, e.g. a container. The size of the platform can be chosen such, that a standard shipping container can be stored on the platform. Additionally or alternatively at least one such platform can serve as a laydown area for a crane, e.g. a crane that is attached to the transition piece and/or a crane that is attached to the nacelle. The platform or platform can also be used for landing equipment and/or personal from ships and/or to enter the transition piece, especially as a first step of entering the tower of the wind turbine.

The interior space can comprise a central section and at least three further sections extending horizontally outward from the central section. Overall a star shape can result.

The transition piece can comprise a crane to move equipment or parts. As discussed previously a laydown area for that crane can also be provided as part of the transition piece.

The transition piece can at least partially be made of steel. This is especially useful for reinforcing the transition piece and for providing complex shapes, e.g. for staircases, ladders, doors and doorframes etc.

Preferably, the transition piece is at least partially made of concrete. It can especially be made of steel reinforced concrete. Several metal components can be added, e.g. railings and/or additional metal sheets, e.g. in laydown areas for cranes. At least parts of these metal components can be attached before the transition piece is connected to the foundation. This allows for an easy on-shore assembly of the transition piece.

The embodiments of the invention also concern an offshore support structure, comprising a foundation and a transition piece according to the present embodiments of the invention, wherein the transition piece is attached to the foundation via the connection area. Different foundation types can be used, e.g. a gravity foundation, a monopole, a tripod or a jacket structure. To attach the foundation to the seabed, suction buckets can be used. Since the transition piece according to the present embodiments of the invention can add additional weight, suction buckets or a gravity foundation can be designed smaller and lighter, since the additional weight counteracts any movement of the foundation.

The embodiments of the invention also concern a wind turbine that comprises an offshore support structure according to the present embodiments of the invention and a wind turbine tower, wherein the wind turbine tower is connected to a connection area of the transition piece.

Additionally, the embodiments of the invention concern a method for assembling an offshore support structure, wherein a pre-produced transition piece according to the present embodiments of the invention are attached to a foundation via the connection area of the transition piece. Preferably at least one electrical component and/or a railing and/or a steel plate attached to a floor of the transition piece and/or a door or doorframe is already premounted to the transition piece before the transition piece is attached to the foundation.

BRIEF DESCRIPTION

Some of the embodiments will be described in detail, with reference to the following figures, wherein like designations denote like members, wherein.

DETAILED DESCRIPTION

Figure 1:
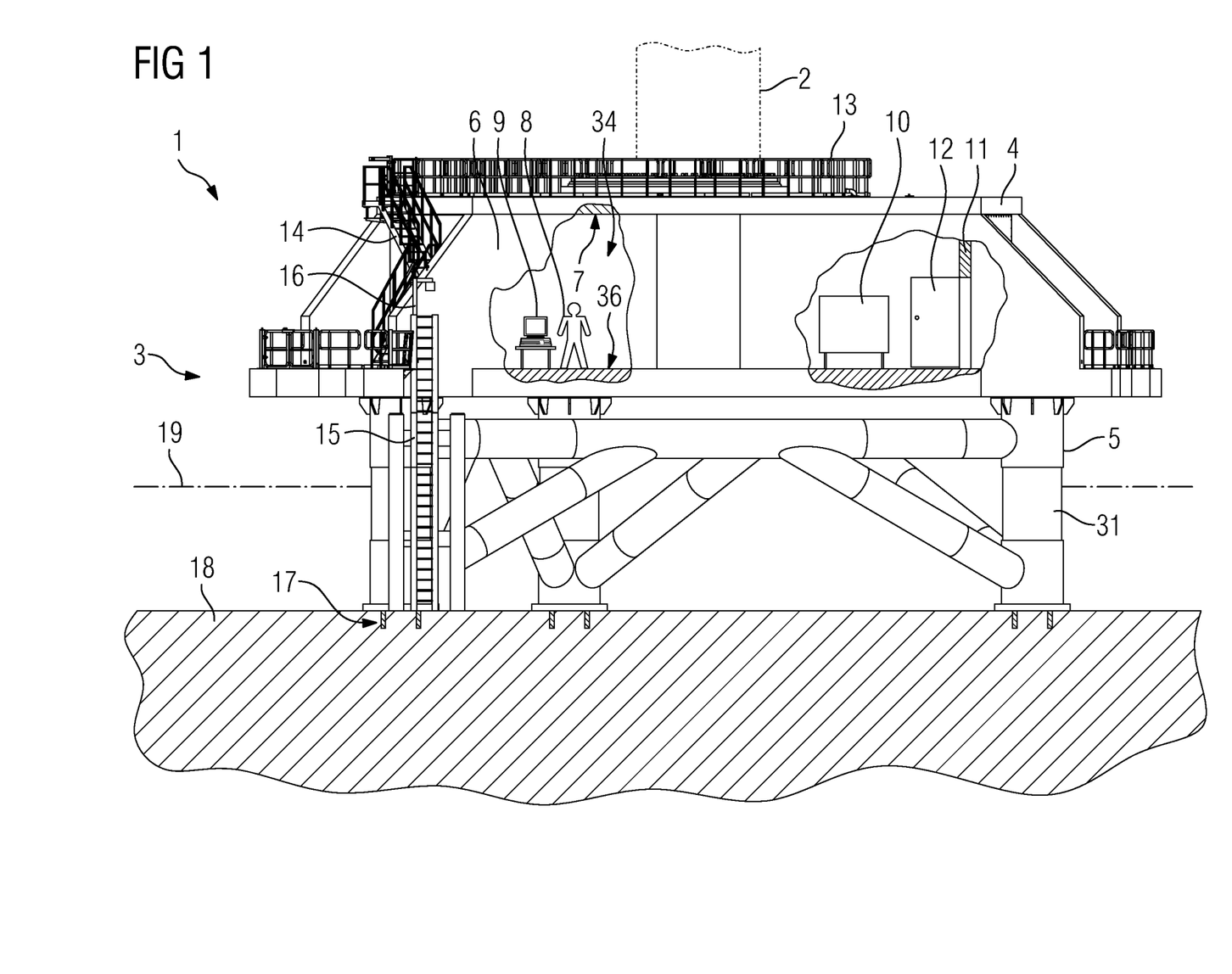
FIG. 1 is an embodiment of a wind turbine according to the present invention, comprising an embodiment of a transition piece according to the present invention.

FIG. 1 shows a wind turbine 1 designed for offshore use. The wind turbine 1 comprises a tower 2 of the wind turbine 1, that carries the nacelle and the rotor including the rotor blades of the wind turbine 1. Those components are not shown. Various arrangements for the nacelle and the rotor are known in the prior art and shall therefore not be discussed in detail.

The tower 2 is attached to an offshore support structure 3 that comprises a transition piece 4 that is used to connect the tower 2 and therefore the wind turbine itself to the foundation 5, in this case a jacket foundation. The foundation 5 rests on the seabed 18 and is connected to the seabed 18 via suction buckets 17. Obviously other foundations, e.g. a gravity foundation or a monopole could be used. It is also possible to use different connection methods to connect the foundation 5 to the seabed 18.

The foundation 5 extends beyond the water level 19. Above the water level 19 the transition piece 4 is attached to the foundation 5. This connection will be discussed in detail later.

The transition piece comprises a floor 36, walls 6 and a roof 7. The transition piece 4 can be made of concrete, especially steel reinforced concrete. The floor 36, walls 6 and roof 7 can provide an interior space 34 that can be used by personal 8, e.g. to access the tower 2, and for electrical components 9, 10. The electrical component 10 can be switchgear for the wind turbine and/or can comprise at least one transformer and/or converter. The electrical component 9 can be used for controlling the wind turbine and can e.g. be a computer.

The transition piece 4 comprises several additional components, especially made from steel. Examples of these components are the railings 13, the staircase 14, a crane 16 and a ladder 15. To close of the interior space 7 against the environment, doorframes 11 can be mounted to the walls 6, the roof 7 and/or the floor 36 of the transition piece 4. Doors 12 can be inserted into the doorframes 11.

The assembly of the offshore support structure 3 and further features of the transition piece 4 will be discussed with respect to FIGS. 2 to 4 that show two different states of assembly of the offshore support structure 3 and different views of the offshore support structure 3.

Figure 2:
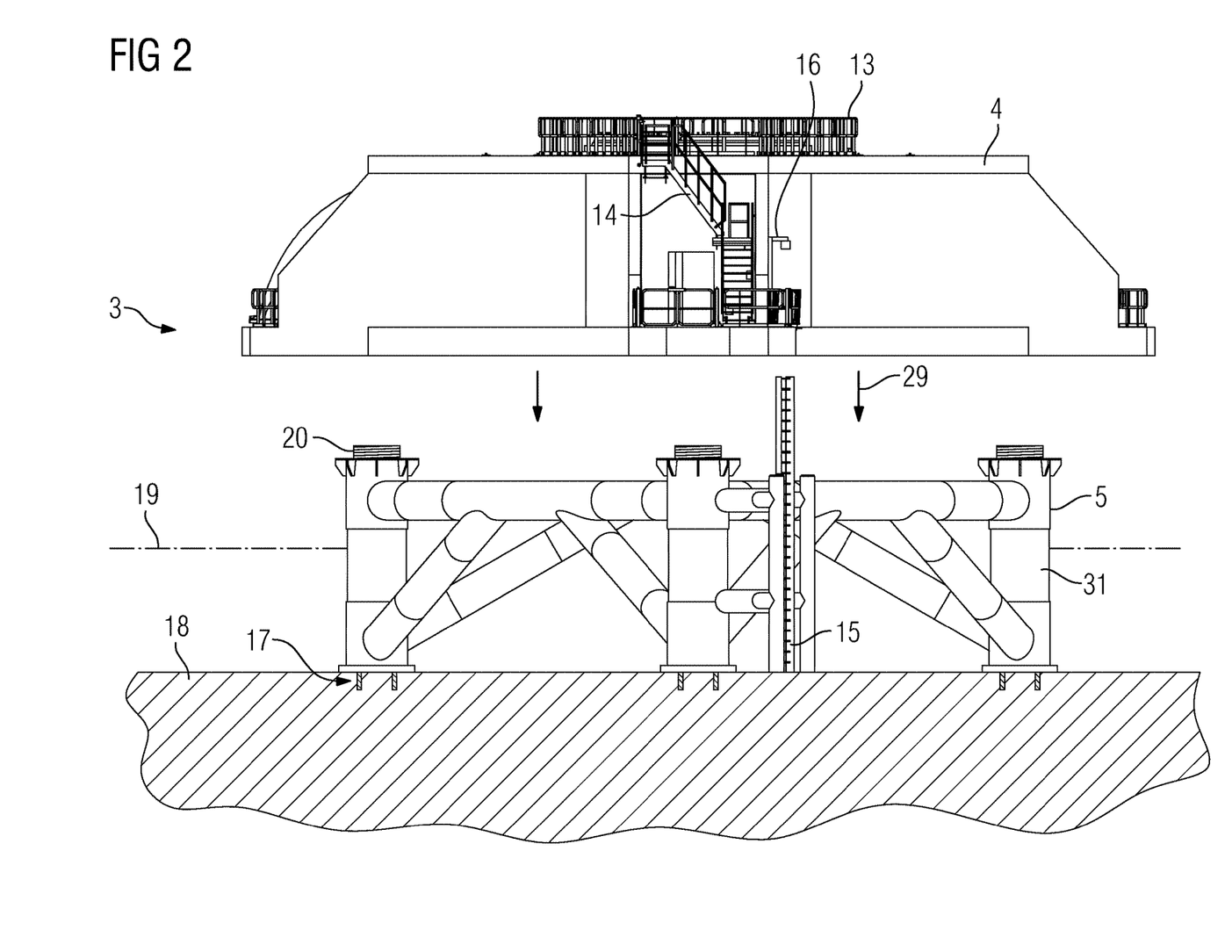
FIG. 2 is a view of a first state of assembly for an embodiment of the offshore support structure according to the present invention used in the wind turbine shown in FIG. 1.

As shown in FIG. 2 the foundation 5 can be attached to the seabed 18 via suction buckets 17 as discussed before. This method and other methods for attaching the foundation 5 to a seabed 18 are well known in the prior art and will not be discussed in detail. The transition piece 4 can be preproduced onshore.

The floor 36, the walls 6 and the roof 7 can be made from one piece of especially steel reinforced concrete. This structure can be poured as one piece or poured as several pieces and then assembled into one piece, e.g. by additional concrete pouring.

The transition piece 4 can already comprise premounted components before mounting the transition piece 4 to the foundation 5. E.g. the doorframes 11, the doors 12, the railings 13, the staircase 14 and/or the crane 16 or at least parts of the crane 16 can already be preattached to the transition piece 4. Additional components that can be preattached are shown in FIG. 3, that shows a top view of the offshore support structure 3 before attaching the tower 2. These components can be steel plates 24, 26, 30, that can be used as laydown areas for the crane 16 and/or a crane located in the nacelle of the wind turbine and/or for storing a container, especially on the steel plate 26. It can also be advantageous to add at least one hatch 25 into the roof 7. The hatch 25 can e.g. be made from steel and can be attached prior to mounting the transition piece 4 to the foundation 5.

The transition piece 4 is lowered onto the foundation 5, e.g. by a crane as shown in FIG. 2 by the arrows 29. The transition piece comprises connection areas 21 for connecting the foundation 5. Bolts 20 of the foundation 5 can be inserted into holes provided in the connection areas 21 and can then be attached to the transition piece 4.

In the shown example a jacket structure with three legs 31 is used as the foundation 5. The transition piece 4 is connected to the three legs 31 via the three connection areas 21. The tower 2 can be connected to a connection area 22 of the transition piece 4 via a flange 28.

Figure 3:
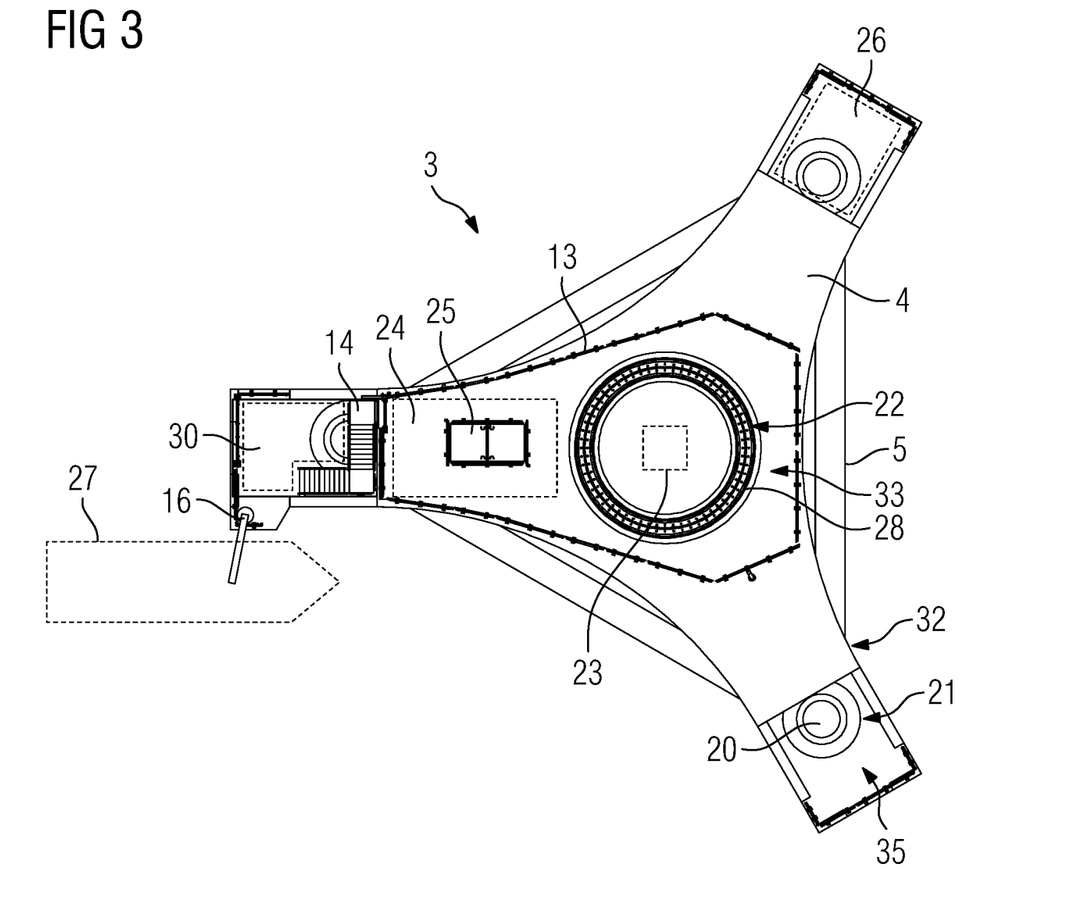
FIG. 3 is a view of a second state of assembly for an embodiment of the offshore support structure according to the present invention used in the wind turbine shown in FIG. 1.
Figure 4:
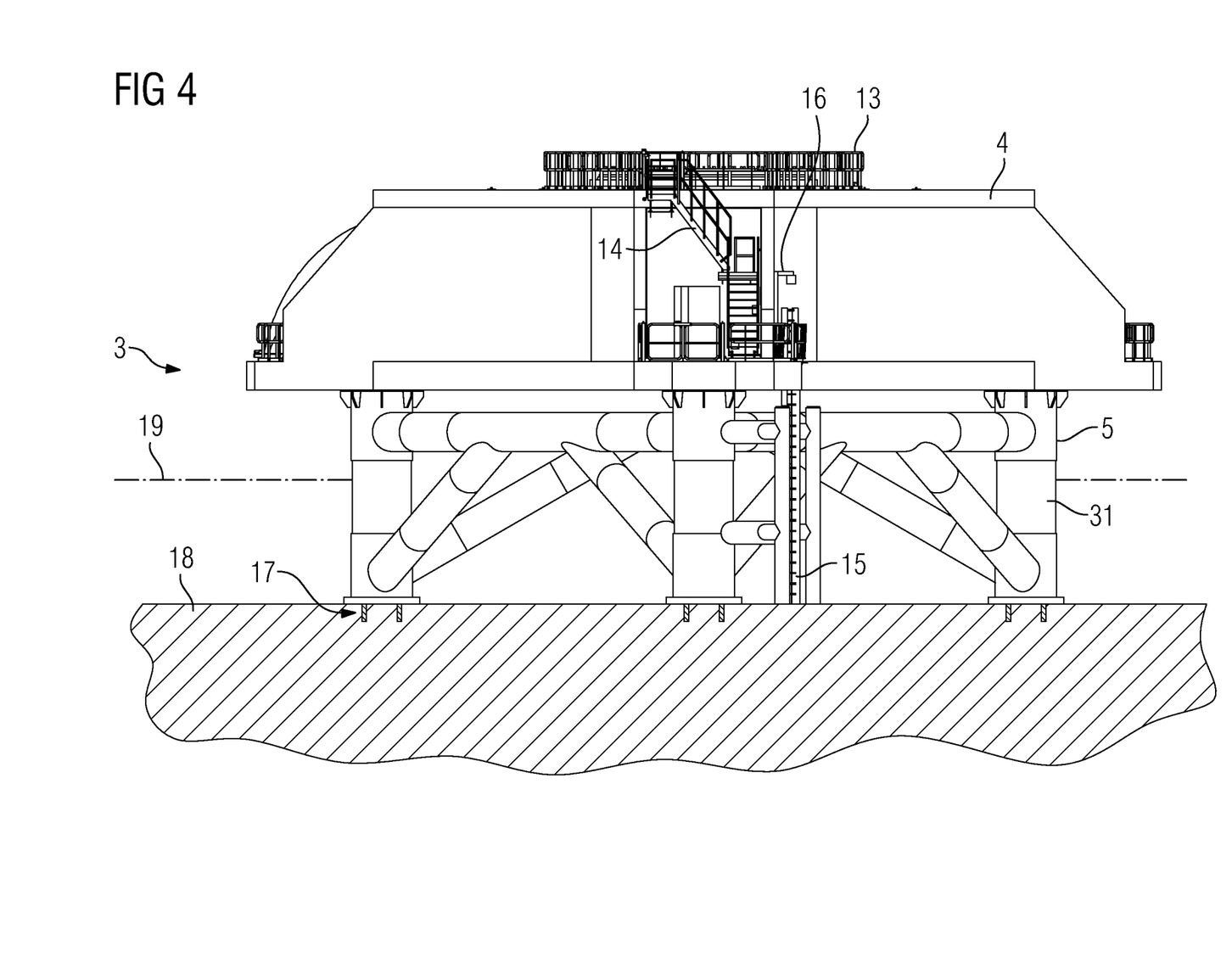
FIG. 4 is a view of a third state of assembly for an embodiment of the offshore support structure according to the present invention used in the wind turbine shown in FIG. 1.

As seen in FIG. 3 the transition piece 4 is star shaped. It comprises three legs 32. It is advantageous to use the same number of legs 31, 32 for the foundation 5 and the transition piece 4. The transition piece can comprise a central section 33 and the legs 32 that extend horizontally outward from the central section 33 to form the shape of the floor 36 of the transition piece. Parts of the floor 36 are covered by the walls 6 and the roof 7 to provide the interior space 34. The interior space 34 can allow for access to the tower 2 in the central section 33, e.g. via an elevator 23 of the tower 2. The interior space 34 of the transition piece 4 is used to house electrical equipment of the wind turbine, like transformers, convertors or switchgear, as discussed above. The interior space 34 can be used for service and maintenance and to store equipment or square parts.

The transition piece 4 comprises a platform 35 on the outer end of each leg 32. The floor 36 of the transition piece 4 is prolonged over the roof 7 in these sections. The platforms 35 can be used to store equipment, to land equipment from a vessel 27 and for personal to enter the wind turbine. An example of a docking vessel 27 is shown schematically in FIG. 3. The equipment located in the transition piece 4 can be transferred to the platforms 35 at the end of the legs 32 of the transition piece 4 and can be easily transferred to and from a vessel 27 to be exchanged.

In the shown example the tower 2 can be attached to the roof 7 of the transition piece 4. In an alternative embodiment it would be possible for the tower 2 to extend through the roof 7 of the transition piece 4 and to be mounted on the floor 36 of the transition piece 4. The tower 2 can e.g. comprise a flange and can be connected to the transition piece 4 by bolts.

The transition piece 4 can be mounted to the foundation 5, especially to a jacket structure, by a crane. The crane lifts the transition piece 4 or major parts of the transition piece 4 onto the foundation 5. The transition piece 4 is lowered onto the foundation 5 as shown by the arrows 29.

If only parts of the transition piece are attached in that step, additional parts, e.g. additional electrical components, doors, platforms, containers etc., can then be added to the transition piece 4 to complete the transition piece 4.

The tower can e.g. be transferred towards the transition piece 4 by a crane. The tower is then connected to the transition piece 4. This connection can be established by bolts. As discussed above the tower can be connected to the upper part of the transition piece 4, e.g. the roof 7.

Alternatively the tower can be connected to the floor 36 of the transition piece 4. In this case the tower 2 can be lowered through an opening in the roof 7 of the transition piece 4 or the transition piece 4 can provide a free space for the tower to be connected to the floor 36.

As shown in FIGS. 1 to 4, the transition piece 4 can comprise a crane 16 or hoist equipment to hoist equipment or parts from a vessel 27 to the transition piece 4, especially to one of the platforms 35. The equipment or parts can be stored on the platforms 35 or in the interior space 34. The interior space 34 can comprise a craning system to move parts from one place to another. There can be a rail system in the interior space 34 for a crane or a load to move on.

At least one of the platforms 35 can be prepared to be approached by a vessel 27. Vessels are used to access offshore wind turbines. The vessels 27 can land on the leg 31 of the foundation 5 or the leg 32 of the transition piece 4. Personal and/or equipment can be transferred from the vessel 27 to the transition piece 4 or vice versa.

The interior space 34 of the transition piece 4 can be accessed through a door 12. The interior space 34 of the transition piece provides a space that is protected from the environment and thus e.g. from wind and rain. Each of the legs 32 comprises a platform 35 and an interior space 34. The interior space 34 of the legs 32 and/or the central section 33 can comprise electrical equipment, e.g. a converter, a transformer and/or switchgear for the wind turbine.

The transition piece 4 can be equipped with railings 13 to provide a high safety for personal and prevent accidents. Railings 13 can especially be provided on the outer edges of the platforms 35. The railings 13 can be opened to allow the access to the platform for personal or equipment. Doors 12 in the walls 6 allow access to the interior space 34 of the transition piece 4 and to the platforms 35 at the end of the legs 32. Part of one or more legs 32 can be partially uncovered to provide the platforms 35. A helipad or a heli-drop zone can be attached to one of the legs 32, to allow an approach by helicopter. The helicopter might land on the platform 35.

Part of the electrical gear of the wind turbine and/or an electrical connection to further offshore and/or onshore infrastructure can be provided on the transition piece 4. As previously discussed, access to the tower 2 can be provided from within the interior space 34 of the transition piece 4. The previously discussed elevator 23 can be used for that access.

The discussed offshore support structure 3 provides several advantages. A transition piece 4 with a simple geometry of reinforced concrete can be used. By using concrete instead of steel for parts of the construction of the wind turbine 1, especially of the offshore support structure 3, the cost of the wind turbine can be reduced. The amount of steel necessary for platforms and railings can be minimized. Due to the additional weight of the transition piece 4 the size of the suction buckets 17 can be reduced by liminating tension loading through the life time. By moving parts of the necessary equipment from the tower 2 to the transition piece 4 the tower 2 and the further components of the wind turbine can be simplified and several components can be installed very early in the construction process.

Figure 5:
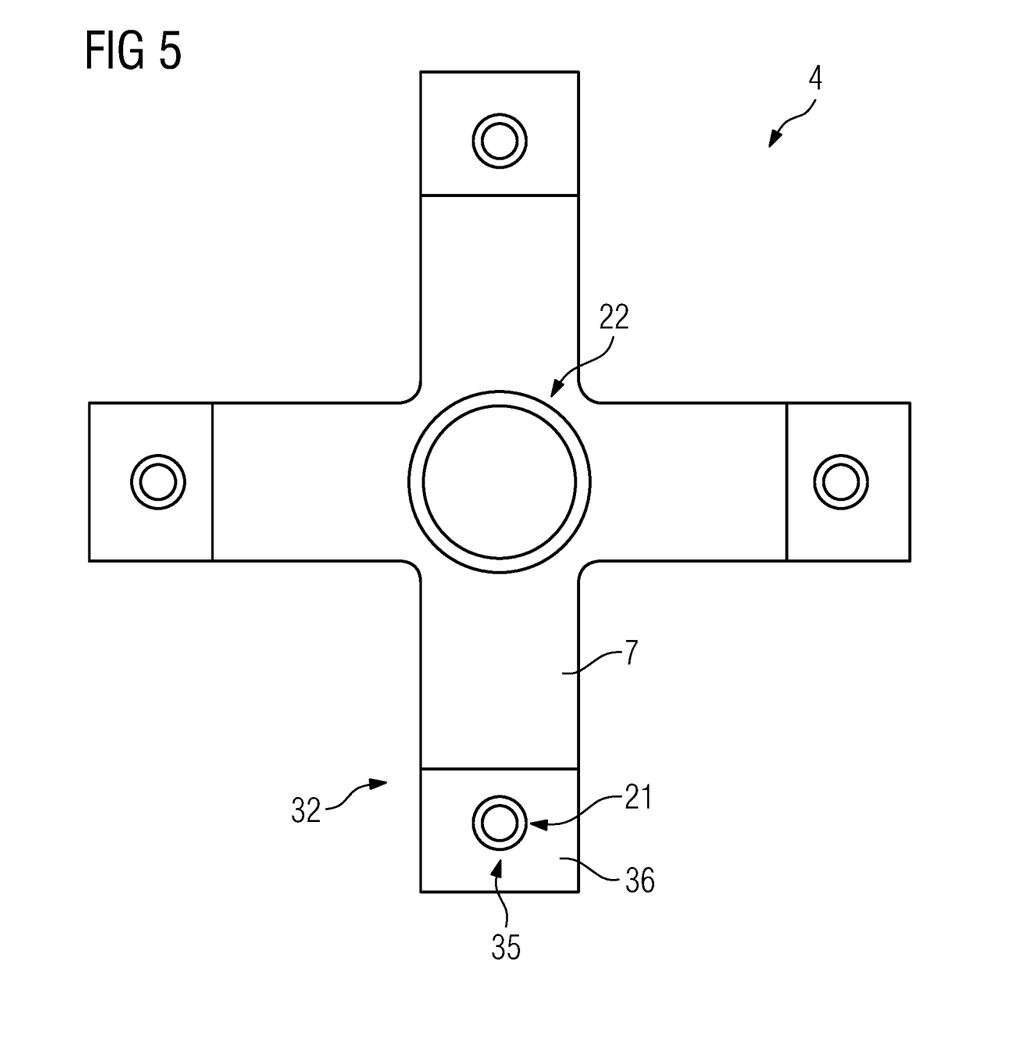
FIG. 5 is a further embodiment of a transition piece according to the present invention.

FIG. 5 shows an alternate embodiment of the transition piece 4. The same reference numerals are used, since the overall structure of the discussed transition pieces 4 is very similar. The transition piece 4 shown in FIG. 5 has a star shape with four legs 32. This structure is advantageous when a foundation with four legs 31 is used. Each of the connection areas 21 can in this case be connected to one of the legs 31 of the foundation 5. As discussed before, the transition piece 4 can have an interior space covered by a roof 7 and the floor 36 can extend beyond the roof 7 to form platforms 35 at the end of the legs 32. The additional components discussed previously, e.g. the electrical components 9, 10, the doorframes 11, the doors 12, the railings 13, the staircases 14, the ladders 15, the cranes 16, the steel plates 24, 26, 30 and/or the hatches 25 can be added to the transition piece 4 with the advantages discussed above.

The transition piece 4 could be made of metal or a composite material, e.g. a fibre reinforced material, instead of the concrete or reinforced concrete construction discussed above. The transition piece 4 can comprise windows and/or transparent parts to allow light to enter the interior space 34.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A transition piece for connecting a wind turbine to a foundation, the transition piece comprising:
   a floor and sidewalls connected to the floor;
   a roof connected to the sidewalls, wherein an interior space is defined by the roof, the floor, and the sidewalls;
   at least three leg sections extending radially outward from a central section; and
   a connection area to be connected to the foundation, the connection area located at an outer end of the at least three legs distal to the central section.

2. The transition piece according to claim 1, wherein the at least three legs form a portion of the floor of the transition piece.

3. The transition piece according to claim 1, further comprising: a connection area that is prepared and arranged to connect a wind turbine tower to the transition piece.

4. The transition piece according to claim 1, wherein the floor, at least some of the side walls and the roof are made of a same material.

5. The transition piece according to claim 1, wherein at least one electrical component of the wind turbine is located in the interior space of the transition piece.

6. The transition piece according to claim 1, wherein an outer end of the floor of the transition piece is prolonged beyond the roof, thereby creating an open platform.

7. The transition piece according to claim 1, further comprising a crane to move equipment or parts.

8. The transition piece according to claim 1, wherein the transition piece is at least partially made of steel.

9. The transition piece according to claim 1, wherein the transition piece is at least partially made of concrete.

10. An offshore support structure, comprising a foundation and the transition piece according to claim 1, wherein the transition piece is attached to the foundation via the connection area.

11. A wind turbine comprising the offshore support structure according to claim 10 and a wind turbine tower, wherein the wind turbine tower is connected to a connection area of the transition piece.

12. A method for assembling the offshore support structure according to claim 10, the method comprising attaching the transition piece to a foundation via the connection area of the transition piece.

* * * * *